United States Patent
Fischer et al.

(10) Patent No.: US 7,886,595 B2
(45) Date of Patent: Feb. 15, 2011

(54) MOTION SENSOR HAVING MICROMECHANICAL SENSOR AND MAGNETORESISTIVE CIRCUIT ON SAME SUBSTRATE

(75) Inventors: Frank Fischer, Gomaringen (DE); Markus Sonnemann, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 11/714,955

(22) Filed: Mar. 6, 2007

(65) Prior Publication Data
US 2007/0214887 A1      Sep. 20, 2007

(30) Foreign Application Priority Data
Mar. 7, 2006     (DE) .................... 10 2006 010 484

(51) Int. Cl.
*G01P 1/00*     (2006.01)
*G01P 15/08*    (2006.01)
(52) U.S. Cl. .................... 73/493; 73/514.31
(58) Field of Classification Search ........... 73/514.31, 73/493, 431, 514.33, 514.34
See application file for complete search history.

(56) References Cited

U.S. PATENT DOCUMENTS

| | | | | |
|---|---|---|---|---|
| 4,079,804 A | * | 3/1978 | Paillard | 180/14.1 |
| 4,967,598 A | * | 11/1990 | Wakatsuki et al. | 73/514.12 |
| 5,671,161 A | * | 9/1997 | Bennet et al. | 702/183 |
| 5,970,794 A | * | 10/1999 | Yoshida | 73/514.09 |
| 6,131,457 A | * | 10/2000 | Sato | 73/514.31 |
| 6,507,187 B1 | * | 1/2003 | Olivas et al. | 324/207.21 |
| 6,703,132 B1 | * | 3/2004 | Yasuda et al. | 428/447 |
| 6,927,465 B2 | * | 8/2005 | Smith et al. | 257/421 |
| 6,952,042 B2 | * | 10/2005 | Stratton et al. | 257/418 |
| 7,219,549 B2 | * | 5/2007 | Honkura et al. | 73/514.31 |
| 2004/0207035 A1 | * | 10/2004 | Witcraft et al. | 257/427 |

FOREIGN PATENT DOCUMENTS

DE      101 04 868      8/2002

\* cited by examiner

*Primary Examiner*—Helen C. Kwok
(74) *Attorney, Agent, or Firm*—Kenyon & Kenyon LLP

(57) ABSTRACT

A motion sensor includes a substrate at least having one micromechanical acceleration sensor and a magnetoresistive circuit. The micromechanical acceleration sensor and the magnetoresistive circuit are constructed on the same substrate.

10 Claims, 2 Drawing Sheets

MOTION SENSOR HAVING MICROMECHANICAL SENSOR AND MAGNETORESISTIVE CIRCUIT ON SAME SUBSTRATE

FIELD OF THE INVENTION

The present invention takes its starting point from a motion sensor having a substrate at least having one micromechanical acceleration sensor and a magnetoresistive circuit.

BACKGROUND INFORMATION

For determining a relative motion, for example, for local navigation, a device is known in the related art, the sensor system of which is made up of a combination of acceleration sensors and an electrical compass on the basis of magnetic field detectors. The discrete components are combined in a control or monitoring device having a corresponding evaluation circuit. The data of the individual sensors are brought together and a so-called sensor-fused system is created.

Navigational devices rely upon the detection of motion in space. In existing systems this is achieved by a combination of speed (odometer or pedometer), direction (rate of rotation or compass information) and an underlying map. Particularly in inexpensive systems, the navigation occurs with the help of a compass. In this case, the precision with which the direction is determined depends on the exact orientation of the device in three-dimensional space. Combining the compass with a triaxial acceleration pick-up allows for the orientation of the device in space to be precisely determined and thus for the precision of the directional information to be increased. For this purpose, the acceleration pick-up can also supply information about the step frequency. Devices of the related art use several different components for these different sensor tasks.

A micromechanical component having an anodically bonded cap and backside contacting through the substrate is described in German Patent Application No. DE 10104868. The backside of the substrate is suited for semiconductor processing.

SUMMARY OF THE INVENTION

The present invention takes its starting point from a motion sensor having a substrate, at least having one micromechanical acceleration sensor and one magnetoresistive circuit. An essence of the present invention lies in the fact that the micromechanical acceleration sensor and the magnetoresistive circuit are constructed on the same substrate.

An advantageous refinement of the motion sensor according to the present invention provides for the micromechanical acceleration sensor to be situated essentially on a first side of the substrate and for the magnetoresistive circuit to be situated on a second, in particular an opposite side of the substrate. For this purpose, advantageously, two sides of a substrate may be processed essentially independently of each other, which allows for a simple and cost-effective manufacture.

Another advantageous refinement of the motion sensor according to the present invention provides for the micromechanical acceleration sensor to be situated on a first side of the substrate, to be encapsulated by thin layers situated above it, and for the magnetoresistive circuit to be configured thereon. Advantageously, in this instance it is not necessary to turn the substrate over during its manufacture.

Advantageously, the arrangement of the acceleration sensor and the magnetoresistive circuit on top of each other saves chip real estate.

The micromechanical acceleration sensor is configured to be multiaxial, in particular triaxial, so as to be able to measure accelerations in all spatial directions. This is advantageous particularly for 3D navigation and for the position independence of the motion sensor.

A particularly advantageous refinement of the motion sensor according to the present invention provides for the micromechanical acceleration sensor and the magnetoresistive circuit to be connected to a common evaluation circuit. Advantageously, such a motion sensor is created on the smallest possible space as an integrated sensor-fused system.

An advantageous refinement of the present invention provides for a monolithic combination of a multiaxial (e.g. triaxial) acceleration sensor and a magnetoresistive circuit. A construction is described, in which the micromechanical structures of the acceleration pick-ups are combined with the magnetoresistive components of the electronic compass on one chip. The combination and sequential processing of an acceleration sensor, in particular of a multiaxial acceleration sensor, for example having a so-called MPT construction, as described in German Patent Application No. DE 10104868, or having a thin-layer encapsulation, and the components of an electric compass, which can be manufactured using the planar technique, is advantageous. A triaxial acceleration sensor is sensitive to acceleration in three spatial directions. This provides special advantages for navigation. The advantage of the construction according to the present invention is the integration of different converter structures on a common chip surface. As a result, the chip surface is used multiple times and a possibility is created for reducing costs as compared to the system solution known from the related art. The small size that can be achieved by the functional integration, however, is seen as an important advantage. In the manner provided, all functions required for measuring a relative motion can be produced in one chip. A common evaluation circuit (ASIC) can be used to evaluate the sensor signals and the existing chip surface can be used jointly.

DETAILED DESCRIPTION

The present invention is presented in detail on the basis of the specific embodiments described in the following.

Figure 1:
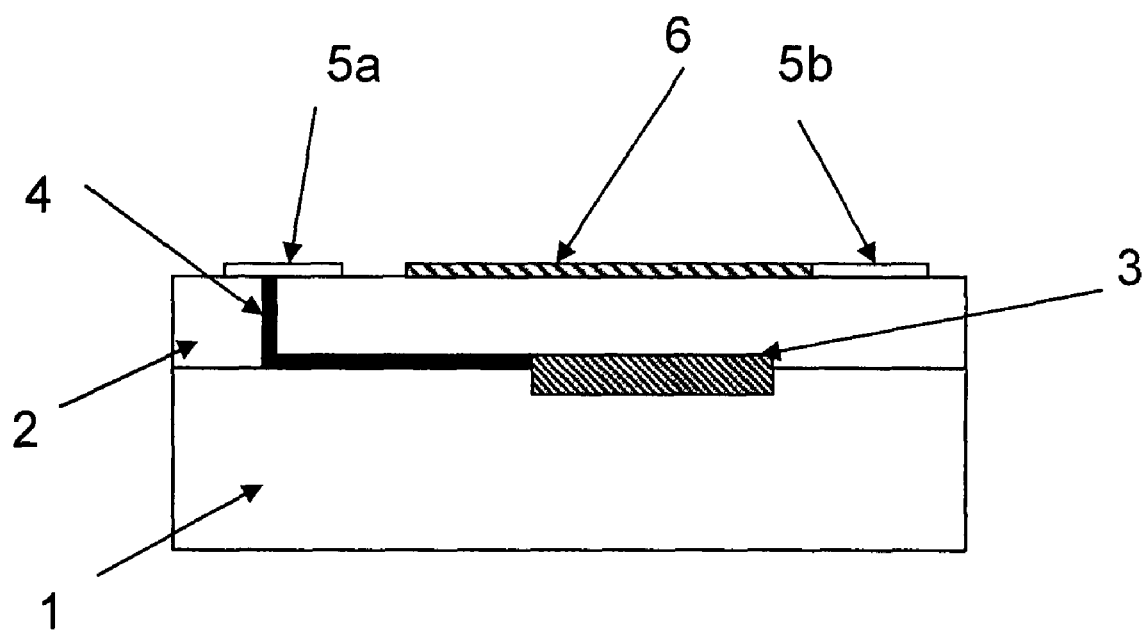
FIG. 1 shows a cross section through a layer stack in a specific embodiment of a motion sensor according to the present invention.

FIG. 1 shows a cross section through a layer stack in a specific embodiment of a motion sensor according to the present invention. A micromechanical component having an anodically bonded cap and backside contacting through the substrate is known from German Patent Application No. DE 10104868. The backside of the substrate is suited for semiconductor processing. In this instance, first the schematic structure of such a micromechanical component is shown.

Represented are made up of a base wafer 1, a sensor substrate 2 having contact passages, so-called via contacts 4, which electrically connect a surface-micromechanical structure 3, in this example a triaxial acceleration sensor 3, to contact surfaces, that is, bonding pads 5*a*.

According to the present invention, a circuit 6 is now deposited on the surface of the sensor chip, i.e. on the backside of substrate 2, with the aid of which it is possible via magnetoresistive converters to measure an external magnetic field even in the orientation (electrical compass). Magnetoresistive circuit 6 is electrically connected to bonding pads 5b. The processing for the compass structure is technologically compatible with the back-end processing of the inertial sensor components. In particular, a thermal and chemical compatibility is achievable in the process.

Fundamentally, the combination according to the present invention of an electronic compass and a multiaxial acceleration sensor is not limited to the so-called MPT construction described above. The combination can be implemented in principle if the topography and the thermal load capacity of the surface-micromechanical structures allow for the MR layers to be processed further (MR: magnetoresistive).

In another exemplary embodiment, which is not shown here in a drawing, the acceleration sensor is initially provided on a substrate in a surface-micromechanical construction. The acceleration sensor is provided with a thin-layer encapsulation, made up of one or several layers, which is deposited over the micromechanical structures. The thin-layer encapsulation has as the uppermost layer a semiconductor layer, which is suited for further processing in semiconductor processes. This may be, for example, an epitactically deposited silicon layer. On or in this semiconductor layer, the magnetoresistive circuit 6, manufactured by planar technique for example, is now provided.

The design of an MR circuit that is suited for a motion sensor according to the present invention is known from the related art (e.g. Application Node "Electronic Compass Design using KMZ51 and KMZ52", AN00022, Philips Semiconductors).

Figure 2:
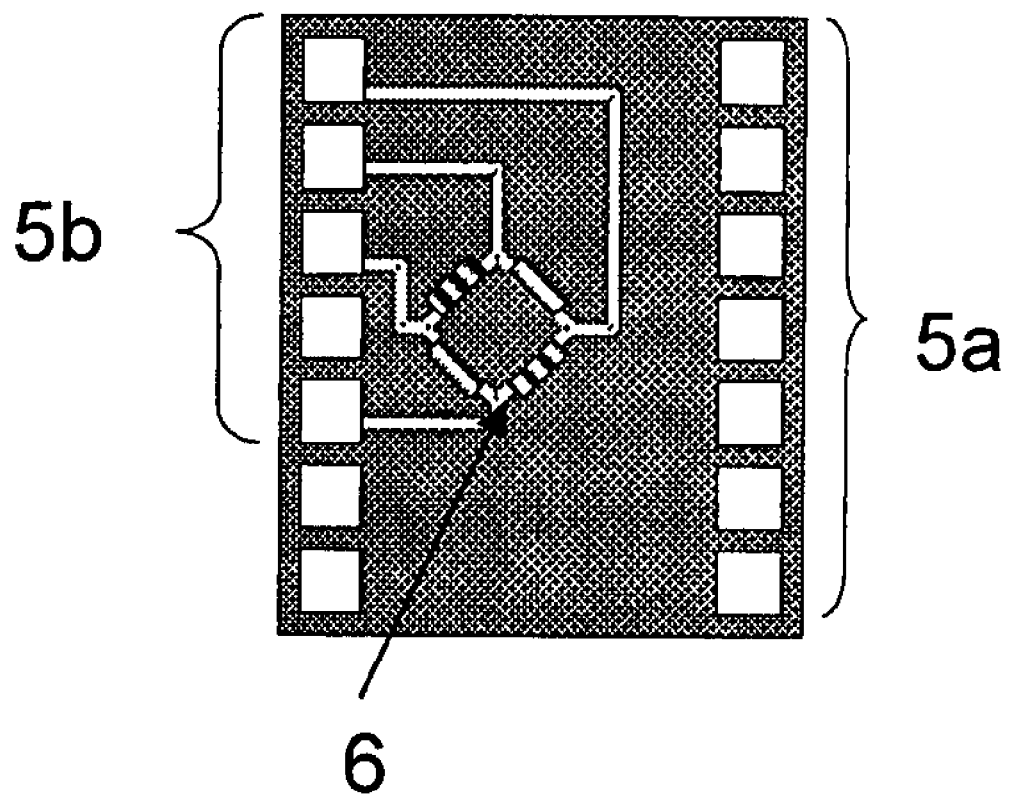
FIG. 2 shows a top view onto a motion sensor according to the present invention.

FIG. 2 shows the top view of a motion sensor according to the present invention. A motion sensor is shown in a top view having electrical connections 5a, to which an evaluation circuit for the acceleration sensor is connected. MR circuit 6 (here shown in a highly simplified manner) is deposited above the micromechanical structure of the acceleration sensor, which lies buried under the visible surface as shown in FIG. 1. The example shown here is a Wheatstone bridge made of a magnetoresistive material known from the related art. The magnetoresistive material may be, for example, an alloy of high magnetic permeability, made up of 78% nickel and 21.5% soft iron, manganese and molybdenum and other materials as it is also used for transformer cores.

The design of structure 2 is known from the related art. Structure 2 can be electrically contacted via bonding pads 5b, to which the blocks of an evaluation circuit for the magnetic field sensor are connected. Acceleration sensor 3 and MR circuit 6 may also be connected to a common integrated evaluation circuit. In this manner, a motion sensor in the form of a sensor-fused system made up of an acceleration sensor and an electric compass is created on the smallest possible space.

What is claimed is:

1. A motion sensor comprising:
   a substrate;
   a micromechanical acceleration sensor mounted on the substrate; and
   a magnetoresistive circuit mounted on the substrate;
   wherein the micromechanical acceleration sensor is situated substantially on a first surface of the substrate and the magnetoresistive circuit is situated on a second surface of the substrate, and wherein the second surface of the substrate is opposite the first surface of the substrate, and
   wherein the micromechanical acceleration sensor and the magnetoresistive circuit are constructed on the same substrate.

2. The motion sensor according to claim 1, wherein:
   the micromechanical acceleration sensor is situated on a first side of the substrate,
   the micromechanical acceleration sensor is encapsulated by thin layers situated above the micromechanical acceleration sensor, and
   the magnetoresistive circuit is situated above the thin layers.

3. The motion sensor according to claim 1, wherein the micromechanical acceleration sensor is a multiaxial acceleration sensor.

4. The motion sensor according to claim 1, wherein the micromechanical acceleration sensor is a triaxial acceleration sensor.

5. The motion sensor according to claim 1, wherein the micromechanical acceleration sensor and the magnetoresistive circuit are connected to a common evaluation circuit.

6. The motion sensor according to claim 1, wherein:
   the micromechanical acceleration sensor is situated on a first side of the substrate,
   the micromechanical acceleration sensor is encapsulated by thin layers situated above the micromechanical acceleration sensor,
   the magnetoresistive circuit is situated above the thin layers, and
   the micromechanical acceleration sensor and the magnetoresistive circuit are connected to a common evaluation circuit.

7. The motion sensor according to claim 6, wherein the micromechanical acceleration sensor is a multiaxial acceleration sensor.

8. The motion sensor according to claim 6, wherein the micromechanical acceleration sensor is a triaxial acceleration sensor.

9. The motion sensor according to claim 1, wherein:
   the micromechanical acceleration sensor is situated on a first side of the substrate,
   the micromechanical acceleration sensor is encapsulated by thin layers situated above the micromechanical acceleration sensor,
   the magnetoresistive circuit is situated above the thin layers, and
   the micromechanical acceleration sensor is a multiaxial acceleration sensor.

10. The motion sensor according to claim 1, wherein:
    the micromechanical acceleration sensor is situated on a first side of the substrate,
    the micromechanical acceleration sensor is encapsulated by thin layers situated above the micromechanical acceleration sensor,
    the magnetoresistive circuit is situated above the thin layers, and
    the micromechanical acceleration sensor is a triaxial acceleration sensor.

* * * * *